United States Patent [19]

Ihn et al.

[11] Patent Number: 4,865,779

[45] Date of Patent: Sep. 12, 1989

[54] LENS MOLDING APPARATUS AND METHOD

[75] Inventors: Paul T. Ihn, North Hudson, Wis.; Larry R. Boughten, Hugo, Minn.

[73] Assignee: Minnesota Mining and Manufacturing Company, St. Paul, Minn.

[21] Appl. No.: 132,962

[22] Filed: Dec. 15, 1987

[51] Int. Cl.$^4$ .......................................... B29D 11/00
[52] U.S. Cl. ..................... 264/1.1; 249/142; 249/160; 249/175; 264/2.2; 425/808
[58] Field of Search ............... 264/2.2, 1.1; 425/808; 249/142, 160, 175

[56] References Cited

U.S. PATENT DOCUMENTS

| | | | |
|---|---|---|---|
| 3,871,803 | 3/1975 | Beattie | 425/808 |
| 3,915,609 | 10/1975 | Robinson | 264/2.2 |
| 4,121,896 | 10/1978 | Shepherd | 425/412 |
| 4,138,086 | 2/1979 | Mitzutani et al. | 425/808 |
| 4,165,158 | 8/1979 | Travnicek | 264/1.1 |
| 4,208,364 | 6/1980 | Shepherd | 264/2.2 |
| 4,209,289 | 6/1980 | Newcomb et al. | 425/410 |
| 4,211,384 | 7/1980 | Bourset et al. | 425/808 |
| 4,347,198 | 8/1982 | Ohkada et al. | 425/808 |
| 4,402,659 | 9/1983 | Greenbaum | 425/233 |
| 4,440,918 | 4/1984 | Rice et al. | 526/246 |
| 4,640,489 | 2/1987 | Larsen | 425/808 |

FOREIGN PATENT DOCUMENTS 0227365 7/1987 European Pat. Off. .
2187999 9/1987 United Kingdom ............... 425/808

Primary Examiner—James Lowe
Attorney, Agent, or Firm—Donald M. Sell; Walter N. Kirn; James V. Lilly

[57] ABSTRACT

A mold and method is disclosed for the production of a lens that can be placed in or on the eye. The mold employs an inflexible ridge, preferably having a triangular cross section, on one of the mold parts. The ridge contacts the other mold part along an annular line.

10 Claims, 1 Drawing Sheet

LENS MOLDING APPARATUS AND METHOD

TECHNICAL FIELD

This invention relates to molding a lens which can be placed in or on the eye, such as a contact lens, and prosthetic devices such as an intraocular lens, or cornea implant (such as an intralamellar lens). Such lenses are sometimes referred to hereinafter as synthetic eye lenses.

BACKGROUND ART

Techniques for molding synthetic eye lenses from reactive materials have been shown in the art. For example, U.S. Pat. Nos. 4,209,289 and 4,402,659 disclose the use of mold halves which contact each other on blunt, flat surfaces that surround the periphery of the mold cavity. This technique has not proven to be entirely satisfactory. For example, the contacting flat surfaces must be as perfectly flat as possible so as to insure proper contact and alignment of the mold halves during the molding operation. This has proven to be very difficult to achieve as very slight variations in the flatness of these surfaces prevent the mold halves from being properly aligned.

U.S. Pat. Nos. 4,208,364 and 4,121,896 disclose the use of a mold having male and female mold sections. One of the sections employs a thin rim which contacts the molding surface of the other section. The rim flexes so that the two mold sections can approach each other and compensate for shrinkage of the lens material that occurs during polymerization.

This type of mold also has not proven entirely satisfactory. For example, the rim must be very thin in order to flex enough to compensate for the polymerization shrinkage. As a result, the rim is fragile and readily susceptible to damage. Consequently, extreme care must be taken in handling and storing the mold half with the rim on it.

DISCLOSURE OF THE INVENTION

The present invention provides a mold for the manufacture of a synthetic eye lens and a method of using the mold. A synthetic eye lens typically varies in diameter from 6 to 15 mm and has anterior and posterior optical surfaces. The exact diameter of the lens is somewhat dependent upon the type of lens to be produced. For example, a contact lens generally varies from 9 to 15 mm in diameter; an intraocular lens generally varies from 6 to 7 mm in diameter; and an artificial cornea generally varies from 5 to 9 mm in diameter.

The mold of the invention has an anterior molding part and a posterior molding part each of which has a molding surface adapted to form one of the optical surfaces of the lens. One of these molding parts also has an essentially inflexible ridge which surrounds the molding surface of that part at its periphery and rises above it. The ridge is adapted to contact the other mold part at the periphery of its molding surface, preferably on an annular flat surface which surrounds the periphery of the other molding surface. The ridge and the optional flat surface are coaxial with the molding surface which they surround.

As it is used herein, the phrase "substantially inflexible" means that the ridge undergoes virtually no horizontal displacement when subjected to a pressure of psi (3.45 kPa) along the longitudinal axis of the mold part to which it is attached. This rigidity prevents the mold parts from approaching each other enough to compensate for polymerization shrinkage. Consequently, the ridge does not provide a mechanism for accommodating such shrinkage. By way of example, the inflexible ridge preferably will be displaced by no more than 1 micron, more preferably by no more than 0.1 micron, in the X or horizontal direction when subjected to the above-identified pressure.

The present invention also provides a method for manufacturing a lens which comprises the steps of providing a mold of the type just described, charging a predetermined quantity of a reactive material onto one of the molding surfaces, closing the mold so that the inflexible ridge contacts the periphery of the other molding surface and forms a cavity containing the unreacted reactive material, and reacting the reactive material.

The present invention overcomes the disadvantages of the prior art. For example, contact between the two mold parts is achieved along an annular line. This substantially eliminates the problems associated with contact between flat surfaces and eliminates the need to manufacture extremely smooth flat surfaces. Additionally, the inflexible ridge used in the present invention is very sturdy. Thus it overcomes the problems caused by the frailty of the rim utilized in molds such as those disclosed in U.S. Pat. No. 4,208,364 and 4,121,896.

Other advantages of the present invention will become apparent as the invention is discussed in detail hereinafter.

BRIEF DESCRIPTION OF THE DRAWINGS

The present invention is further illustrated in the accompanying drawings in which like reference characters refer to the same element throughout the several views. Each of these views is an enlarged sectional view of the mold or a specific part thereof.

With respect to the individual views.

DETAILED DESCRIPTION

Figure 1:
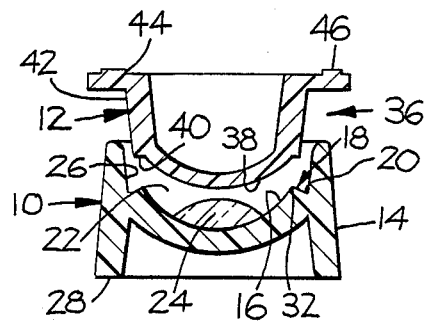
FIG. 1 shows the mold parts separated from one another with a quantity of reactive material charged onto one of the molding surfaces.

Referring now to the drawings, FIG. 1 shows a mold of the invention that comprises two parts, specifically an anterior mold part 10 and a posterior mold part 12. As illustrated in the drawings, the anterior mold part 10 is a female part and the posterior mold part 12 is a male part. However, it is understood that the anterior mold part could be a male part and the posterior mold part could be a female part. As illustrated here, the anterior mold part 10 comprises a cylindrical support 14 which extends above both an anterior molding surface 16 and an inflexible ridge 18. The anterior molding surface 16, the ridge 18 and an annular ring 20 close the support 14 and form a receptacle 22 adapted to receive both a quantity of a reactive material 24 and the posterior mold part 12.

The anterior molding surface 16 has an optical axis (not shown) and is adapted to provide the anterior optical surface on the lens without the requirement of further finishing that surface. The curvature of the anterior molding surface 16 is entirely a matter of choice. Thus it may be concave (as shown), convex, or flat. Moreover, it may be entirely spherical, entirely aspherical, or a combination thereof. Furthermore, the central portion of the anterior molding surface 16 may be toric, although it is generally preferred that the outer or peripheral portion be symmetrical about the longitudinal axis (not shown) of the mold part. The inflexible ridge 18 (shown more clearly in FIG. 3) surrounds the anterior molding surface 16 at its periphery. Although the precise cross sectional shape of the ridge 18 can be varied, it preferably is essentially triangular in cross section. The ridge 18 comprises an inner surface 30 which rises above the molding surface 16 and, in the embodiment shown, is essentially parallel to the longitudinal axis of the mold part 10. The ridge 18 further comprises an apex 32, an outer inclined surface 34, and the annular ring 20 between the inclined surface 34 and an inner wall 26 of the cylindrical support 14.

Figure 3:
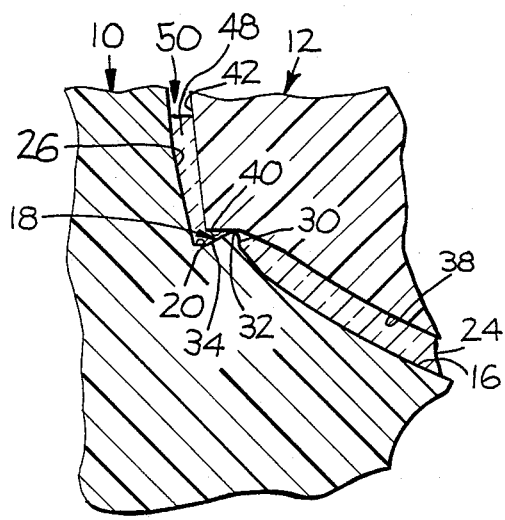
FIG. 3 is an enlarged view of the mold junction area showing the ridge with a rounded apex at the periphery of one of the molding surfaces and a flat surface at the periphery of the other molding surface.
Figure 4:
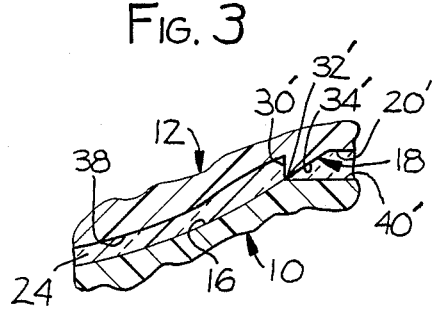
FIG. 4 shows an alternative embodiment of the mold junction area of FIG. 3 with the ridge at the periphery of the other molding surface.
Figure 5:
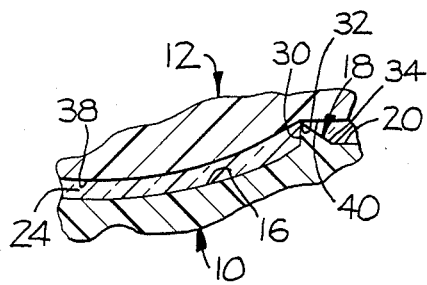
FIG. 5 is an enlarged view of the mold junction area showing a ridge having a pointed apex.

The apex 32 of the ridge 18 may be sharp, as shown in FIGS. 4 and 5, or rounded as is shown in FIG. 3. The angle included in the apex 32 (also referred to herein as the apex angle) preferably is at least about 45° and most preferably at least 60°. The apex 32 provides the annular line of contact to the other mold part.

The height of the ridge 18 is dependent upon the desired edge thickness of the lens. Accordingly, the height may be varied widely although it has been found that heights of from 70 to 120 microns are suitable for most contact lens applications.

The anterior mold part 10 also comprises the inner wall 26 and a bottom surface 28. The inner wall 26 tapers outwardly from the annular ring 20 to facilitate receipt of the posterior mold part 12. The bottom surface 28 preferably is both as flat as possible and is perpendicular to the longitudinal axis of the annular mold part 10.

The posterior mold part 12 preferably comprises a cylindrical base 36 extending downward from a posterior molding surface 38 and a flat surface 40. Together the base 36, the posterior molding surface 38 and the flat surface 40 are adapted to be received in the receptacle 22 of the anterior mold part 10.

Like the anterior molding surface 16, the posterior molding surface 38 has an optical axis (not shown) and is adapted to provide the posterior optical surface on the lens without the need for any further finishing operations to that surface. And like the anterior molding surface 16, the curvature of the posterior molding surface 38 is entirely a matter of choice and may vary in the same manner as the curvature of the anterior molding surface 16.

The flat surface 40 (shown more clearly in FIG. 3) surrounds the posterior molding surface 38 at its periphery. Although the surface 40 is flat, it need not be at any specific angle with respect to the longitudinal axis (not shown) of the posterior mold part 12. However, it is preferred that the plane of the flat surface be essentially perpendicular with respect to the longitudinal axis.

The posterior mold part 12 further comprises an outer wall 42 and an annular column 44. The outer wall 42 tapers outwardly from the flat surface 40 at an angle which is cooperative with the slope of the inner wall 26. This facilitates insertion of the posterior mold part into the interior mold part.

The annular column 44 has a top surface 46 which is preferably as flat as possible and perpendicular to the longitudinal axis of the posterior mold part 12.

The longitudinal axes of the anterior and the posterior mold parts are preferably coincident with the optical axes of the anterior and the posterior molding surfaces respectively. However, in certain cases these two axes need not be coincident.

Figure 2:
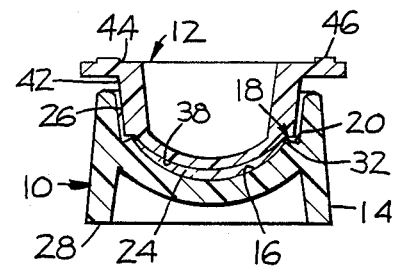
FIG. 2 shows the mold parts of FIG. 1 assembled so as to form a cavity containing the reactive material.

In manufacturing a lens according to the invention, the reactive material 24 is charged onto one of the molding surfaces, such as the anterior molding surface 16 as shown in FIG. 1. The posterior mold part 12 is then inserted into the anterior mold part 10 as shown in FIG. 2 so that the apex 32 of the inflexible ridge 18 contacts the flat surface 40 of the posterior mold part 12. When the mold is closed in this fashion, excess reactive material 48 is squeezed out into a reservoir 50 created between the outer wall 42 of the posterior mold part 12 and the inner wall 26 of the anterior mold part 10. This is shown more clearly in FIG. 3.

The design of the two mold parts is such that insertion of the posterior mold part 12 into the anterior mold part 10 causes the optical axes of the confronting molding surfaces to go into coincident alignment. In the embodiment illustrated in FIGS. 1 and 2, the taper of the inner wall 26 increases near its intersection with annular ring 20 so as to insure proper alignment of the mold parts. See FIG. 3. Additionally, the inner diameter of the receptacle 22 is designed to be just slightly larger than the outer diameter of the flat surface 40. This permits the posterior mold part 12 to be readily inserted into the anterior mold part 10 while simultaneously aligning the two optical axes. It has been found that a distance between the outer wall 42 and the inner wall 26 of about 20 microns or less permits ready assembly of the mold while retaining the self-aligning capability.

When the mold is assembled, a cavity is formed. The outer boundaries of this cavity define the desired shape of the lens to be made. As shown in the drawings, the cavity will produce a lens having a concave anterior surface and a convex posterior surface. A lens of this design is particularly well suited for use as a contact lens. However, lenses having other anterior/posterior curvatures may be produced by varying the curvature of the molding surfaces. Thus, convex/convex lenses, convex/plano lenses, etc. may also be produced and the molds used to make them are within the scope of this invention.

Once the mold is assembled and the optical axes aligned, the assembly is subjected to conditions adequate to cause the reactive material to react or polymerize. Preferably the assembly is placed between parallel surfaces during exposure to these conditions to insure that alignment of the optical axes is maintained. Also, it is preferred that a slight amount of pressure (e.g., 0.5 psi/3.45 kPa) be applied longitudinally to the mold as reaction takes place to insure that the apex of the ridge is fully seated on the other mold part.

A variety of reaction techniques may be employed to produce the lens. Although the exact conditions employed are dependent upon the nature of the reactive materials utilized, examples of useful techniques include thermal radiation, infrared radiation, electron beam radiation, gamma radiation, ultraviolet light radiation, and the like. Moreover, combinations of such techniques may be used.

During reaction the volume of the reactive material may contract. Surprisingly, the present invention produces high quality lenses even though the inflexible ridge prevents the mold parts from approaching each other enough to compensate for such shrinkage. And, even though a very low amount of pressure is preferably applied to the mold during reaction, this pressure is insufficient to force the mold parts close enough together to compensate for the volume shrinkage that occurs.

Upon completion of the reaction, the mold parts are separated and the lens recovered, such as by any number of techniques known to the art. The peripheral edge of the lens may then be polished and the lens cleaned and inspected.

An automated technique for making a lens using the mold of the invention is described in European Patent publication 0 277 365, published July 1, 1987, incorporated herein by reference.

The tools used to make the mold of the invention generally comprise an anterior tool and a posterior tool. Each comprises an optical insert, an outer sleeve which receives the optical insert, and a back core which together with the optical insert and outer sleeve forms a cavity of desired shape. One of the outer sleeves is machined so that, together with one of the optical inserts, it provides a negative of the desired shape of the inflexible ridge.

Known machining and polishing operations may be used to manufacture the tools. The tools may be fabricated from various metals such as electroless or nickel plated steel, stainless steel, etc. The tools may be repeatedly used in injection molding machines to produce the desired quantity of mold parts.

A number of polymeric materials may be used to make the molds of the invention. Examples of such materials include thermoplastic materials such as polyolefins (e.g., polyethylenes, polypropylenes, polybutenes), polyamides (e.g., nylon 6, etc.), polyesters, polysulfones, and the like.

Reactive materials that may be used in the process of the invention may be selected from a wide variety of chemical classes. Examples of these materials include hydrophobic ethylenically unsaturated monomers, hydrophilic monomers capable of forming three-dimensional polymer matrices such as those used to prepare hydrogel lenses, and perfluoropolyethers such as those disclosed in U.S. Pat. No. 4,440,918 incorporated herein by reference. The preceeding classes of reactive materials are but exemplary of the many classes that may be used as will be understood as a result of reading this disclosure.

As stated herein, the mold parts shown in FIGS. 1–3 represent only one embodiment. The invention is in no way limited to this embodiment as is shown by FIG. 4 which illustrates a variation in which the inflexible ridge is located at the periphery of the posterior molding surface and the flat surface is located at the periphery of the anterior molding surface.

We claim:

1. A mold for manufacturing a lens which can be placed in or on the eye comprising;
    (A) an anterior mold part having an anterior molding surface with an anterior optical axis,
    (B) a posterior mold part having a posterior molding surface with a posterior optical axis,
    (C) an annular inflexible ridge having an apex surrounding and rising above one of said molding surfaces at the periphery thereof,
    (D) an annular flat surface surrounding the other of said molding surfaces at the periphery thereof,
    wherein said apex of said inflexible ridge is adapted to contact said flat surface along a narrow annular line which has a diameter greater than the diameter of the periphery of said other molding surface.

2. A mold according to claim 1 wherein said ridge has an apex for contacting said other molding surface.

3. A mold according to claim 2 wherein said ridge has a triangular cross section.

4. A mold according to claim 3 wherein the apex of said cross section is rounded.

5. A mold according to claim 2 wherein the included angle of said apex is at least about 45°.

6. A mold according to claim 1 wherein said inflexible ridge surrounds and rises above said anterior molding surface.

7. A mold according to claim 1 wherein said inflexible ridge surrounds and rises above said posterior molding surface.

8. A mold assembly for the production of a lens to be placed in or on the eye, said assembly comprising anterior and posterior mold parts, wherein:
    (A) said anterior mold part has;
        (1) an anterior molding surface capable of forming an anterior surface on said lens,
        (2) an annular, inflexible ridge at the periphery of said anterior molding surface, said ridge rising above said anterior molding surface and having an apex adapted to provide line contact to said posterior mold part,
        (3) a support around said ridge, said support having a wall rising above said ridge and, together with said ridge and said anterior molding surface, forming a receptacle adapted to receive said posterior mold part,
    (B) said posterior mold part has;
        (1) a posterior molding surface capable of forming a posterior molding surface on said lens,
        (2) a flat surface surrounding said posterior molding surface at the periphery thereof, said flat surface being adapted to contact said ridge when said mold parts are assembled and form a cavity of desired configuration, and
        (3) a base around said flat surface which projects downward therefrom, said base being adapted to be received in said receptacle.

9. A method for the manufacture of lens to be placed in or on the eye comprising the steps of
    (A) providing a mold assembly comprising an anterior mold part having an anterior molding surface, a posterior mold part having a posterior molding surface, a flat surface surrounding one of said molding surfaces at the periphery thereof, and an annular, inflexible ridge surrounding and rising above the other of said molding surfaces at the periphery thereof, said ridge having an apex for contacting said flat surface,
    (B) charging a predetermined quantity of a reactive material onto one of said molding surfaces,
    (C) inserting one of said molding parts into the other so that said apex of said annular, inflexible ridge contacts said flat surface along a line having a diameter greater than the diameter of said one molding surface so as to form a molding cavity that defines the desired shape of said lens, said cavity containing said reactive material, (D) subjecting said reactive material to conditions sufficient to form said lens in said molding cavity, and (E) recovering said lens from said molding cavity.

10. A method according to claim 9 comprising the further step of aligning said optical axes of said molding surfaces prior to charging said reactive material to said one molding surface.

* * * * *

UNITED STATES PATENT AND TRADEMARK OFFICE
CERTIFICATE OF CORRECTION

PATENT NO.  : 4,865,779

DATED       : September 12, 1989

INVENTOR(S) : Paul T. Ihn & Larry R. Boughten

It is certified that error appears in the above-identified patent and that said Letters Patent is hereby corrected as shown below:

Column 1, line 66, "of psi" should be --of 0.5 psi --.

Signed and Sealed this

Seventh Day of August, 1990

Attest:

HARRY F. MANBECK, JR.

*Attesting Officer*    *Commissioner of Patents and Trademarks*